(12) United States Patent
Wang

(10) Patent No.: US 11,983,898 B2
(45) Date of Patent: May 14, 2024

(54) MONITORING METHOD, ELECTRONIC DEVICE AND STORAGE MEDIUM

(71) Applicant: SHENZHEN HITEVISION TECHNOLOGY CO., LTD., guangdong (CN)

(72) Inventor: Yungang Wang, guangdong (CN)

(73) Assignee: SHENZHEN HITEVISION TECHNOLOGY CO., LTD., Shenzhen (CN)

(*) Notice: Subject to any disclaimer, the term of this patent is extended or adjusted under 35 U.S.C. 154(b) by 97 days.

(21) Appl. No.: 17/785,940

(22) PCT Filed: Jun. 9, 2020

(86) PCT No.: PCT/CN2020/095112
§ 371 (c)(1),
(2) Date: Jun. 16, 2022

(87) PCT Pub. No.: WO2021/128747
PCT Pub. Date: Jul. 1, 2021

(65) Prior Publication Data
US 2023/0021863 A1    Jan. 26, 2023

(30) Foreign Application Priority Data

Dec. 23, 2019  (CN) .......................... 201911340725.4

(51) Int. Cl.
*G06T 7/80* (2017.01)
*G06T 7/11* (2017.01)
(Continued)

(52) U.S. Cl.
CPC .................. *G06T 7/80* (2017.01); *G06T 7/11* (2017.01); *G06T 7/20* (2013.01); *G06T 7/62* (2017.01);
(Continued)

(58) Field of Classification Search
None
See application file for complete search history.

(56) References Cited

U.S. PATENT DOCUMENTS

2006/0033834 A1    2/2006  Matsui
2006/0056056 A1*   3/2006  Ahiska ................... H04N 7/181
                                                       359/690
(Continued)

FOREIGN PATENT DOCUMENTS

CN      101106700 A    1/2008
CN      101198030 A    6/2008
(Continued)

OTHER PUBLICATIONS

PCT International Search Report for PCT/CN2020/095112, dated Sep. 9, 2020, 11 pages.
(Continued)

*Primary Examiner* — Hung Q Dang
(74) *Attorney, Agent, or Firm* — East IP P.C.

(57) ABSTRACT

The application provides a monitoring method, electronic device and storage medium. The method includes determining a target area to be monitored from an acquired image of a monitored scene; determining a target capture posture and a target capture focal length according to the target area; and controlling a Pan Tilt Zoom (PTZ) camera to capture according to the target capture posture and the target capture focal length. The application can monitor any object within the monitored scene using the PTZ camera with a good capture effect.

20 Claims, 5 Drawing Sheets

(51) Int. Cl.
*G06T 7/20* (2017.01)
*G06T 7/62* (2017.01)
*G06T 7/70* (2017.01)
*G06V 10/25* (2022.01)
*G06V 10/74* (2022.01)
*G06V 20/52* (2022.01)
*H04N 7/18* (2006.01)
*H04N 23/61* (2023.01)
*H04N 23/67* (2023.01)
*H04N 23/69* (2023.01)
*H04N 23/695* (2023.01)

(52) U.S. Cl.
CPC ............ *G06T 7/70* (2017.01); *G06V 10/25* (2022.01); *G06V 10/761* (2022.01); *G06V 20/52* (2022.01); *G06T 2207/10148* (2013.01); *G06V 2201/07* (2022.01)

(56) References Cited

U.S. PATENT DOCUMENTS

| | | | |
|---|---|---|---|
| 2007/0236570 A1* | 10/2007 | Sun | G08B 13/19643 348/169 |
| 2009/0262195 A1* | 10/2009 | Yoshida | H04N 23/695 348/222.1 |
| 2011/0310219 A1 | 12/2011 | Kim et al. | |
| 2012/0075467 A1 | 3/2012 | Lee et al. | |
| 2012/0098927 A1 | 4/2012 | Sablak | |
| 2018/0376074 A1 | 12/2018 | Gumpert et al. | |
| 2019/0238743 A1* | 8/2019 | Kim | G06T 3/0018 |

FOREIGN PATENT DOCUMENTS

| | | |
|---|---|---|
| CN | 101291428 A | 10/2008 |
| CN | 101969548 A | 2/2011 |
| CN | 103716594 A | 4/2014 |
| CN | 103986871 A | 8/2014 |
| CN | 104639908 A | 5/2015 |
| CN | 104822045 A | 8/2015 |
| CN | 107016367 A | 8/2017 |
| CN | 107438154 A | 12/2017 |
| CN | 108416285 A | 8/2018 |
| CN | 108632574 A | 10/2018 |
| CN | 110083180 A | 8/2019 |

OTHER PUBLICATIONS

The First Office Action for Chinese Application No. 201911340725.4, dated Jun. 2, 2021, 20 pages.

The extended European search report dated Oct. 30, 2023 for European Application No. 20905705.8, 6 pages.

* cited by examiner

|   | 2 | 3 | 4 |   |
|---|---|---|---|---|
| 1 | A1 | A2 | A3 | A4 | 5 |
| 6 | A5 | A6 | A7 | A8 | 7 |
| 8 | A9 | A10 | A11 | A12 | 9 |
| 10 | A13 | A14 | A15 | A16 | 11 |
| 12 | A17 | A18 | A19 | A20 | 13 |
| 14 | A21 | A22 | A23 | A24 | 15 |
| 16 | 17 | 18 | 19 | 20 |

Fig. 3

|   | 2 | 3 | 4 |   |
|---|---|---|---|---|
| 1 | A1 | A2 | A3 | A4 | 5 |
| 6 | A5 | A6 | A7 | A8 | 7 |
| 8 | A9 | A10 | A11 | A12 | 9 |
| 10 | A13 | A14 | A15 | A16 | 11 |
| 12 | A17 | A18 | A19 | A20 | 13 |
| 14 | A21' | A22' | A23' | A24' | 15 |
| 16 | 17 | 18 | 19 | 20 |

Fig. 4

MONITORING METHOD, ELECTRONIC DEVICE AND STORAGE MEDIUM

CROSS-REFERENCE TO RELATED APPLICATIONS

The present application is a National Stage of International Application No. PCT/CN2020/095112 filed on Jun. 9, 2020, which claims the priority to Chinese patent application No. 201911340725.4 filed on Dec. 23, 2019, both of which are incorporated herein by reference in their entireties.

TECHNICAL FIELD

The present application relates to the technical field of monitoring, and particularly to a monitoring method, electronic device and storage medium.

BACKGROUND

At present, a monitored scene is generally monitored utilizing an image collecting device with a wide-angle lens or a zoom lens. The wide-angle lens has a wide range of viewing angles and a short focal length, and can capture all objects in the scene, but objects farther away from the lens may have lower clarity. The zoom lens has a small range of viewing angles and an adjustable focal length, and can improve clarity of objects in its capturing range by adjusting the focal length, but cannot capture all objects in the scene due to a limited range of viewing angles for capturing.

SUMMARY

The present application provides a monitoring method. The method may include determining a target area to be monitored from an acquired image of a monitored scene; determining a target capture posture and a target capture focal length according to the target area; and controlling a Pan Tilt Zoom (PTZ) camera to capture according to the target capture posture and the target capture focal length.

In an embodiment of the present application, the above determining the target capture posture and the target capture focal length according to the target area may include determining one of preset areas where the target area is located as a target preset area, wherein the preset areas are marked out based on the image of the monitored scene, and a quantity of the preset areas is at least two; determining a corresponding candidate capture posture and a corresponding candidate capture focal length according to the target preset area, a candidate capture posture and a candidate capture focal length corresponding to each of the preset areas being obtained according to a range in the monitored scene corresponding to the preset area captured by the PTZ camera; and determining the target capture posture and the target capture focal length according to the determined candidate capture posture and candidate focal length.

In an embodiment of the present application, the above determining the target capture posture and the target capture focal length according to the determined candidate capture posture and candidate focal length may include selecting a preset area from the image of the monitored scene as a first reference preset area, the first reference preset area being different from the target preset area; determining a posture change ratio parameter according to a distance between the target preset area and the first reference preset area, the candidate capture posture corresponding to the target preset area, and a candidate capture posture corresponding to the first reference preset area; and generating the target capture posture according to a distance between the target area and the target preset area, the candidate capture posture corresponding to the target preset area, and the posture change ratio parameter.

In an embodiment of the present application, the above target capture posture may include a horizontal rotation angle and a vertical rotation angle; for the horizontal rotation angle, the distance between the target preset area and the first reference preset area is a horizontal distance between the target preset area and the first reference preset area, the distance between the target area and the target preset area is a horizontal distance between the target area and the target preset area, wherein the horizontal distance between the target preset area and the first reference preset area is not equal to zero; and for the vertical rotation angle, the distance between the target preset area and the first reference preset area is a vertical distance between the target preset area and the first reference preset area, the distance between the target area and the target preset area is a vertical distance between the target area and the target preset area, wherein the vertical distance between the target preset area and the first reference preset area is not equal to zero.

In an embodiment of the present application, the above determining the target capture posture and the target capture focal length according to the determined candidate capture posture and candidate focal length may include determining a second reference preset area from the image of the monitored scene, the second reference preset area comprising the target preset area and an area of the second reference preset area being larger than an area of the target preset area, or alternatively, the target preset area comprising the second reference preset area and an area of the target preset area being larger than an area of the second reference preset area; obtaining a focal length change ratio parameter according to a ratio of the area of the target preset area to the area of the second reference preset area, the candidate capture focal length corresponding to the target preset area, and a candidate capture focal length corresponding to the second reference preset area; and generating the target capture focal length according to a ratio of an area of the target area to the area of the target preset area, the candidate capture focal length corresponding to the target preset area, and the focal length change ratio parameter.

In an embodiment of the present application, the above determining the target area to be monitored from the acquired image of the monitored scene may include determining one or more candidate target areas from the image; judging whether a quantity of the candidate target areas is greater than a quantity of PTZ cameras; under a condition that the quantity of the candidate target areas is greater than the quantity of PTZ cameras, merging the determined candidate target areas, so that a quantity of merged candidate target areas is not greater than the quantity of PTZ cameras; and determining the merged candidate target areas as target areas.

In an embodiment of the present application, the above merging the determined candidate target areas may include pre-merging every two candidate target areas to obtain pre-merged candidate target areas; determining an area of each of the pre-merged candidate target areas; selecting a pre-merged candidate target area whose area is smallest; and merging two candidate target areas corresponding to the pre-merged candidate target area whose area is smallest.

In an embodiment of the present application, the above merging at least two candidate target areas may include determining an area of each of the candidate target areas; selecting a candidate target area whose area is smallest; determining a first distance between the candidate target area whose area is smallest and each of other candidate target areas; selecting a candidate target area for which the first distance is shortest; pre-merging the candidate target area whose area is smallest with the candidate target area for which the first distance is shortest, to obtain a pre-merged candidate target area; determining an area of the pre-merged candidate target area; comparing the area of the pre-merged candidate target area with a preset area threshold; under a condition that the area of the pre-merged candidate target area is smaller than or equal to the area threshold, merging the candidate target area whose area is smallest with the candidate target area for which the first distance is shortest; under a condition that the area of the pre-merged candidate target area is larger than the area threshold: pre-merging the candidate target area whose area is smallest with each of the other candidate target areas except the candidate target area for which the first distance is shortest sequentially, in an order of first distances from short to long, and when an area of any pre-merged candidate target area is smaller than or equal to the preset area threshold, merging two candidate target areas that are pre-merged to obtain the pre-merged candidate target area.

In an embodiment of the present application, the above merging at least two candidate target areas may include under a condition that areas of all pre-merged candidate target areas are larger than the area threshold, selecting a candidate target area from the other candidate target areas except the candidate target area for which the first distance is shortest sequentially, in an order of areas from small to large; determining a second distance between the selected candidate target area and each of the other candidate target areas; pre-merging the selected candidate target area with each of the other candidate target areas sequentially, in an order of second distances from short to long; and when an area of any pre-merged candidate target area is smaller than or equal to the preset area threshold, merging two candidate target areas that are pre-merged to obtain the pre-merged candidate target area.

In an embodiment of the present application, the above merging at least two candidate target areas may further include under a condition that areas of all pre-merged candidate target areas are larger than the area threshold, selecting a candidate target area from the other candidate target areas except the candidate target area for which the first distance is shortest sequentially, in an order of areas from small to large; determining a second distance between the selected candidate target area and each of the other candidate target areas; pre-merging the selected candidate target area with each of the other candidate target areas sequentially, in an order of second distances from short to long; and when an area of any pre-merged candidate target area is smaller than or equal to the preset area threshold, merging two candidate target areas that are pre-merged to obtain the pre-merged candidate target area.

In an embodiment of the present application, the above merging at least two candidate target areas may include determining a distance between every two candidate target areas; and merging the candidate target areas sequentially, in an order of distances from small to large, until a quantity of the merged candidate target areas is not greater than the quantity of PTZ cameras.

In an embodiment of the present application, the above determining the target area to be monitored from the acquired image of the monitored scene may include determining a moving object and areas where the moving object is located according to a plurality of consecutive frames of the image; and determining the target area based on the areas where the moving object is located.

In an embodiment of the present application, the above determining the target area based on the areas where the moving object is located may include judging whether an quantity of the areas where the moving object is located is greater than a quantity of PTZ cameras; under a condition that the quantity of the areas where the moving object is located is greater than the quantity of PTZ cameras, determining moving ranges of the moving object; ranking priorities of the areas where the moving object is located in an order of the moving ranges of the moving object from large to small; and selecting, in an order of the priorities from high to low and according to the quantity of PTZ cameras, the areas where the moving object is located as target areas; or determining the moving ranges of the moving object; determining candidate areas where the moving object is located for which the moving ranges of the moving object are greater than a preset moving threshold, according to the moving ranges of the moving object; judging whether an quantity of the candidate areas where the moving object is located is greater than the quantity of PTZ cameras; under a condition that the quantity of the candidate areas where the moving object is located is greater than the quantity of PTZ cameras, merging the candidate areas where the moving object is located, so that a quantity of the merged candidate areas where the moving object is located is equal to the quantity of PTZ cameras; and determining the merged candidate areas where the moving object is located as the target area.

In an embodiment of the present application, a wide-angle camera is provided in the above monitored scene, and determining the target area to be monitored from the acquired image of the monitored scene may include dividing the image into a first area and a second area, according to sharpness of photos captured by the wide-angle camera, wherein the sharpness of photos captured by the wide-angle camera reaches a preset sharpness threshold in the first area; and determining the second area as the target area.

The present application further provides a monitoring apparatus. The monitoring apparatus may include:
  an area determination module, configured to determine a target area to be monitored from an acquired image of a monitored scene;
  a parameter determination module, configured to determine a target capture posture and a target capture focal length according to the target area; and
  a control module, configured to control a Pan Tilt Zoom (PTZ) camera to capture according to the target capture posture and the target capture focal length.

The present application further provides an electronic device. The electronic device may include a memory, a processor, and computer programs stored on the memory and executable on the processor. The programs when executed by the processor cause the above monitoring method to be implemented.

The present application further provides a non-transient computer-readable storage medium, which may have computer instructions stored thereon. The computer instructions may be configured to cause a computer to execute the above monitoring method.

The present application further provides a monitoring system. The monitoring system may include a wide-angle camera, an electronic device and a Pan Tilt Zoom (PTZ) camera; wherein the wide-angle camera is configured to capture an image of a monitored scene; and the electronic device is configured to determine a target area to be monitored from an acquired image of the monitored scene, determine a target capture posture and a target capture focal length according to the target area, and control the PTZ camera to capture according to the target capture posture and the target capture focal length.

The present application further provides another monitoring system. The another monitoring system may include an electronic device and a Pan Tilt Zoom (PTZ) camera; wherein the PTZ camera is configured to capture an image of the monitored scene; and the electronic device is configured to determine a target area to be monitored from an acquired image of the monitored scene, determine a target capture posture and a target capture focal length according to the target area, and control the PTZ camera to capture according to the target capture posture and the target capture focal length.

BRIEF DESCRIPTION OF THE DRAWINGS

In order to illustrate technical solutions of embodiments of the present application and prior arts more clearly, drawings necessary for describing the embodiments or the prior arts will be introduced briefly below. Obviously, the drawings described below are only some embodiments of the present application. Those of ordinary skills in the art may obtain other drawings according to these drawings without any creative work.

FIG. 3 is a schematic diagram of an implementation for marking out preset areas according to the present application;

FIG. 4 is a schematic diagram of an implementation for marking out preset areas according to another embodiment of the present application;

DETAILED DESCRIPTION

In order to make objects, technical solutions and advantages of the present application clearer, the present application is further described in details below in combination with specific embodiments and with reference to the drawings.

It should be noted that all expressions using "first" and "second" in embodiments of the present application are for the purpose of distinguishing two entities with the same name but not representing the same or identical parameters. It can be seen that "first" and "second" are only for the convenience of expression and should not be construed as limitations on the embodiments of the present application. Subsequent embodiments will not describe them one by one.

Figure 1:
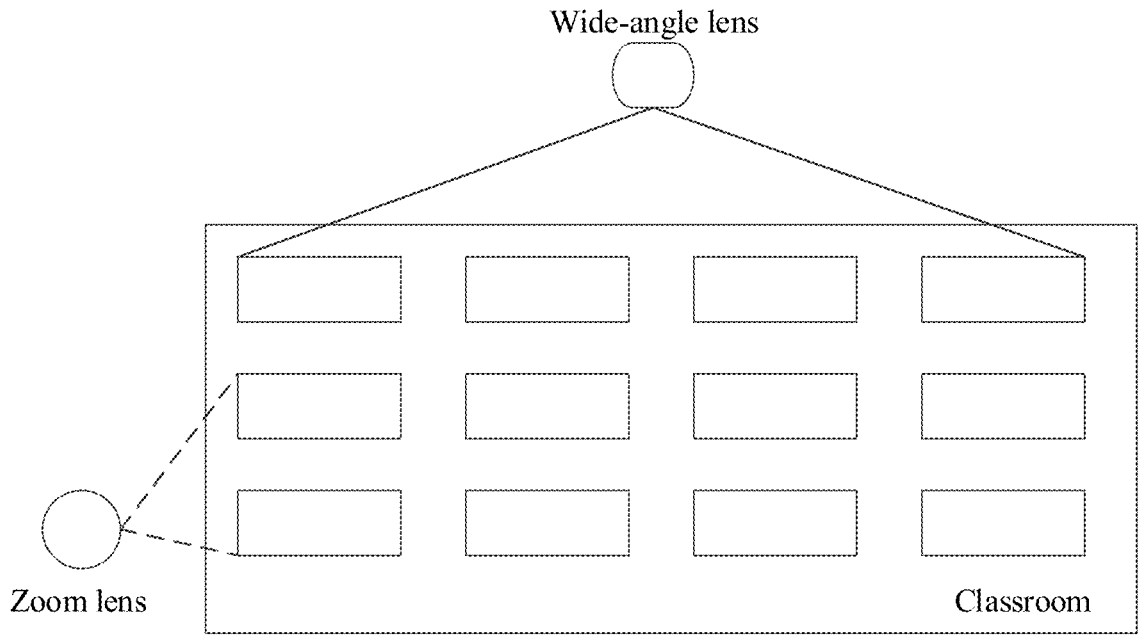
FIG. 1 is a schematic diagram of an application scenario involved in a monitoring method according to the present application.

In an implementation, monitoring of objects in a monitored scene is realized using an image collecting device. As shown in FIG. 1, in an application scenario of school, an image collecting device may be installed in a classroom, and can collect images of students in the classroom for subsequent monitoring processing. However, how to choose a suitable image collecting device becomes a problem. This is because a wide-angle lens has a wide capture range, but has lower clarity when capturing an object farther away from the lens; and a zoom lens can change its capture range by changing its focal length and provide clear pictures within its capture range, but has too limited capture range to capture the entire classroom. A PTZ camera can capture any position in the classroom by adjusting its capture posture and adjust the capture clarity by adjusting its capture focal length, but cannot be aware of a position to be captured, or cannot determine a capture posture and capture focal length for capturing a specific position.

In order to solve the above problems, the present application provides a monitoring method, apparatus, system, electronic device and storage medium, which can determine a target area to be monitored from an image of a monitored scene, determine a target capture posture and a target capture focal length according to the target area, and control a PTZ camera to capture according to the target capture posture and the target capture focal length. As such, the present application can monitor any object in the monitored scene and guarantee good capture effect, by utilizing the PTZ camera to capture any object within the monitored scene.

For convenience of understanding, the monitoring method of the present application will be described in details below with reference to the drawings.

Figure 2:
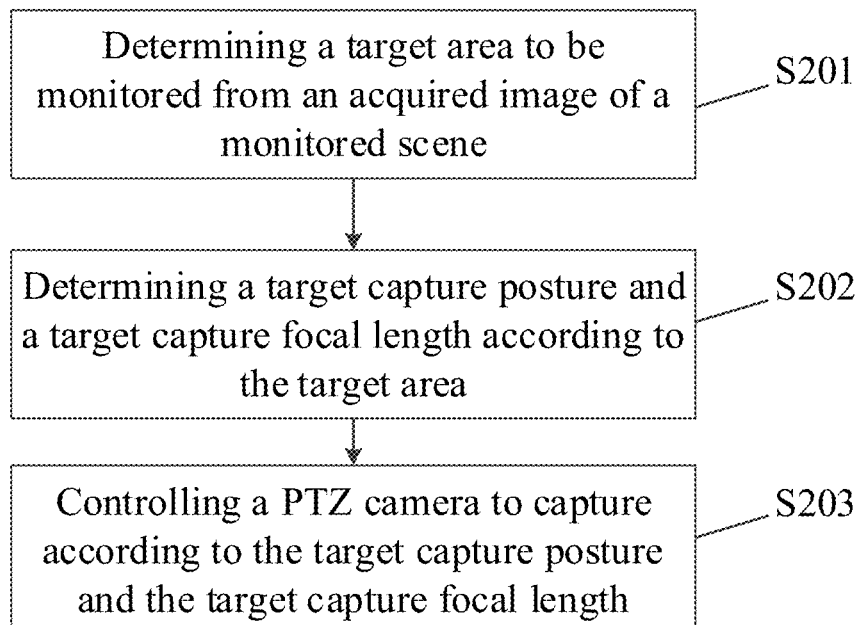
FIG. 2 is a schematic flowchart of an implementation of the monitoring method according to the present application.

FIG. 2 is a schematic flowchart of an implementation of the monitoring method according to the present application. As shown in FIG. 2, the monitoring method 200 includes:

S201: determining a target area to be monitored from an acquired image of a monitored scene;

S202: determining a target capture posture and a target capture focal length according to the target area; and S203: controlling a PTZ camera to capture according to the target capture posture and the target capture focal length.

In embodiments of the present application, the monitored scene may be any scene that needs to be monitored, such as a school, an office building, a parking lot, a factory building, and the like. In order to monitor the monitored scene, an image collecting device may be provided in the monitored scene firstly, a video of the monitored scene may be collected by the image collecting device, and then images may be extracted from the video for subsequent processing.

In some embodiments, in S201, the target area to be monitored in the image may be an area where a moving object is located. For example, S201 may include acquiring a video collected by the image collecting device; extracting images of multiple consecutive frames from the video; determining areas where the moving object is located in the images using any moving object detection algorithm; and determining the target area based on the areas where the moving object is located. For example, if the monitored scene is a classroom, the moving object may be an active student, and an area where the active student is located in images of the classroom is the target area. For another example, if the monitored scene is a parking lot, the moving object may be a moving vehicle, and an area where the moving vehicle is located in images of the parking lot is the target area. In some embodiments, areas where the moving object is located may also be determined using a background differential method for motion segmentation of a static scene. In some specific embodiments, a background image of a static scene may be acquired firstly; a grayscale image of the target moving area may be obtained by performing a differential operation between a currently acquired image frame and the background image; and the grayscale image is then thresholded to extract areas where the moving object is located. Further, in order to avoid the influence of changes in ambient lighting, the background image may be updated according to the currently acquired image frame.

In other embodiments, in S201, the target area to be monitored in the image is a preset area where the monitored object is located. In some examples, S201 may include acquiring a video collected by the image collecting device; extracting images from the video; according to the extracted images, recognizing the monitored object in the images using an image recognition algorithm; and determining the target area based on areas where the moving object locates in the images. For example, the monitored object may be a specific person, animal, plant, license plate, etc., which is not limited specifically.

In some embodiments of the present application, the image collecting device may be any device with an image collecting function. For example, according to a focal length of lens, the image collecting device may be a camera equipped with a wide-angle lens, a zoom lens, a standard lens, or a telephoto lens. A specific model of the image collecting device may be configured according to the actual monitoring needs.

In a practical application, the monitored scene is a classroom where a camera with a wide-angle lens (i.e., a wide-angle camera) is installed. Firstly, a video including all students in the classroom may be collected by the wide-angle camera. Next, a panoramic image of multiple continuous frames may be extracted from the video. Next, according to the panoramic image of multiple continuous frames, an area where an active student is located in the panoramic image may be determined. The area where the active student is located may be determined as the target area to be monitored. For example, the active student may be a student who is raising his/her hand, turning his/her head back, or speaking, and so on. The method of this solution can monitor any active student in the classroom, and thus can be used to realize functions such as unsupervised examination and classroom activity assessment, etc.

In another practical application, the monitored scene is a classroom where at least one PTZ camera is installed. A video including all students in the classroom may be collected by the at least one PTZ camera. Then, a panoramic image of multiple continuous frames may be extracted from the video. Next, according to the panoramic image of multiple continuous frames, an area where an active student is located in the panoramic image may be determined, and the area where the active student is located may be determined as the target area to be monitored. For example, the active student may be a student who is raising his/her hand, turning his/her head back, or speaking, and so on. The method of this solution can monitor any active student in the classroom, and thus can be used to realize functions such as unsupervised examination and classroom activity assessment, etc.

In an embodiment of the present application, in S202, in order to determine the target capture posture and the target capture focal length according to the target area, at first, the image of the monitored scene may be divided into at least two preset areas. In some specific examples, firstly, a video of the monitored scene may be collected by a wide-angle camera or a PTZ camera. Next, a panoramic image of the monitored scene may be extracted from the collected video of the monitored scene, and may be divided into at least two preset areas. After that, for each preset area, a range corresponding to the preset area within the monitored scene may be captured by the PTZ camera sequentially, and a capture posture and capture focal length for the PTZ camera to capture the range corresponding to each preset area within the monitored scene may be determined and may be taken as a candidate capture posture and candidate capture focal length corresponding to the preset area. Methods for marking out the preset areas in the image of the monitored scene and determining a candidate capture posture and candidate capture focal length corresponding to each preset area will be described in details later, and will not be detailed here.

In an embodiment of the present application, after the target area is determined, the above-mentioned target capture posture and target capture focal length may be determined utilizing the candidate capture posture and candidate capture focal length corresponding to each preset area, according to a relationship between the target area and each preset area. The specific determination method will be described in details later, and will not be repeated here.

In an embodiment of the present application, after the above-mentioned target capture posture and target capture focal length are determined, in S203, the PTZ camera may be controlled to capture according to the above-mentioned target capture posture and target capture focal length.

Since the target capture posture and target capture focal length are determined according to and corresponding to the target area to be monitored, characteristics of adjustable capture posture and capture focal length of the PTZ camera can be fully utilized by controlling the PTZ camera to capture according to the target capture posture and target capture focal length, enabling any object in the monitored scene to be monitored, so as to solve the problem that the PTZ camera cannot know the position to be captured or cannot determine a capture posture and capture focal length for capturing a specific position.

In a possible embodiment, an electronic device for executing the monitoring method of the present application can be provided in the PTZ camera. The electronic device may determine the target area to be monitored from the acquired image of the monitored scene, and determine the target capture posture and target capture focal length according to the target area. After that, the electronic device may control the PTZ camera to capture according to the target capture posture and the target capture focal length. Particularly, the PTZ camera may include a tripod head, a lens and the electronic device. The electronic device, after determining the target capture posture and target capture focal length, may control the tripod head to be adjusted to a capture position according to the target capture posture, and control the lens to adjust its focal length according to the target capture focal length, so that the PTZ camera is located at the capture position and captures according to the adjusted focal length. As such, the PTZ camera can capture any object in the monitored scene, and the capture effect can be guaranteed.

Alternatively, an electronic device for executing the monitoring method of the present application can be provided in a terminal that has a data connection with the PTZ camera. The electronic device may determine the target area to be monitored from the acquired image of the monitored scene, and determine the target capture posture and target capture focal length according to the target area. After that, the electronic device may send a control instruction including the target capture posture and the target capture focal length to the PTZ camera. The PTZ camera may receive the control instruction, parse the control instruction to obtain the target capture posture and the target capture focal length, and then capture according to the target capture posture and the target capture focal length.

The terminal may be a mobile terminal or a fixed terminal. The mobile terminal may be, for example, a terminal with a data processing function, such as a smart phone, a tablet computer, and an IPAD, etc.; the fixed terminal may be, for example, a terminal with a data processing function, such as an electronic whiteboard, a desktop computer, a server, etc.; which are not limited specifically. The terminal and the PTZ camera can be connected in any data connection mode, such as a wired connection or wireless connection, etc.

In the embodiments of the present application, since the target capture posture and target capture focal length are determined according to and corresponding to the target area to be monitored, characteristics of adjustable capture posture and capture focal length of the PTZ camera can be fully utilized by controlling the PTZ camera to capture according to the target capture posture and target capture focal length, enabling any object in the monitored scene to be monitored, so as to solve the problem that the PTZ camera cannot know the position to be captured or cannot determine a capture posture and capture focal length for capturing a specific position.

The method for marking out preset areas in the image of the monitored scene will be described in details below with reference to specific examples.

In some possible embodiments, a wide-angle camera may be used to collect a video of the monitored scene.

In an embodiment of the present application, the video of the monitored scene may be acquired from the wide-angle camera, and a panoramic image of the monitored scene may be extracted from the video.

Based on the extracted panoramic image, the panoramic image may be divided into several preset areas. For example, the marked out preset areas may be areas of any shapes, such as square areas, rectangular areas, circular areas, and the like.

As shown in FIG. 3, in an embodiment, the panoramic image is divided into several preset areas, and each preset area is a square area. Particularly, firstly, several boundary points (points 1-20 in the figure) of the image may be determined according to the panoramic image; and then, the panoramic image may be divided into several square areas (square areas A1-A24 in the figure) according to the boundary points.

Allowing for that the target area may be of any size and located at any position in the panoramic image, further, the panoramic image may be divided into at least two levels of preset areas according to sizes. In some embodiments, the panoramic image may be divided into several first-level preset areas. As shown in FIG. 3, a first-level preset area may be a single square area, and the panoramic image is divided into 24 first-level preset areas from A1 to A24; the panoramic image may further be divided into several second-level preset areas, and each of the second-level preset area includes 2×2 square areas, for example, a square area composed of A1, A2, A5, and A6 may be a second-level preset area; the panorama image may further be divided into several third-level preset areas, and each of the third-level preset area includes 4×4 square areas, for example, a square area composed of A1-A16 may be a third-level preset area; and so forth. As such, the panoramic image can be divided into $n^{th}$-level preset areas of different sizes, and each preset area may include N×N square areas, where $N=2^{n-1}$, where n is an integer greater than or equal to 1.

In another possible implementation, the preset areas may also be marked out according to a seating chart.

As shown in FIG. 4, when the panoramic image is divided according to square areas, there may be incomplete dividing. As shown in FIG. 4, the marked out preset areas A21'-A24' are rectangular areas. In this case, the preset areas A21'-A24' may still be regarded as square areas, and in subsequent processing, they may also be taken as square areas, which will be described later.

The method for determining the candidate capture posture and candidate capture focal length corresponding to each preset area will be described in details below with reference to specific examples.

In an embodiment of the present application, the PTZ camera may be used to capture a range within the monitored scene corresponding to each preset area sequentially to obtain a capture posture and capture focal length of the range for capturing the range corresponding to each preset area; and take the obtained capture posture and capture focal length for capturing the range corresponding to each preset area as a candidate capture posture and candidate capture focal length corresponding to the preset area.

According to the embodiment shown in FIG. 3, in a possible implementation, in order to determine the candidate capture postures and candidate capture focal lengths corresponding to all the first-level preset areas, the PTZ camera can be used to capture a range within the monitored scene corresponding to each of the preset areas A1-A24 sequentially in a manner from left to right and from top to bottom. That is, a range within the monitored scene corresponding to the first-level preset area A1 is captured to obtain a capture posture and capture focal length for capturing the range corresponding to the first-level preset area A1; and a candidate capture posture and candidate capture focal length for the preset area A1 are determined based on the capture posture and capture focal length for capturing the range corresponding to the first-level preset area A1. After that, a range within the monitored scene corresponding to the first-level preset area A2 is captured to obtain a capture posture and capture focal length for capturing the range corresponding to the first-level preset area A2; and a candidate capture posture and candidate capture focal length for the preset area A2 are determined based on the capture posture and capture focal length for capturing the range corresponding to the first-level preset area A2. A candidate capture posture and candidate capture focal length for the preset area A4 can be determined after a candidate capture posture and candidate capture focal length for the preset area A4 are determined. In this order, the candidate capture posture and candidate capture focal length corresponding to each first-level preset area are determined finally.

In another possible implementation, parameters of the four corners of the monitored scene may be determined firstly, and then parameters of each preset area may be roughly determined by averaging.

It should be noted that, in some embodiments, the PTZ camera can be manually adjusted, so that the PTZ camera can capture the range within the monitored scene corresponding to each preset area; and then the corresponding capture posture and capture focal length can be recorded respectively, so as to obtain the candidate capture posture and candidate capture focal length corresponding to each preset area. In some other embodiments, the PTZ camera can be controlled by a capture control module, to capture the range within the monitored scene corresponding to each preset area sequentially according to a set order; and then the corresponding capture posture and capture focal length are recorded and stored respectively, and so as to obtain the candidate capture posture and candidate capture focal length corresponding to each preset area.

Figure 5:
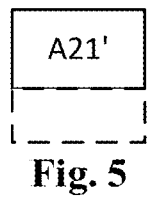
FIG. 5 is a schematic diagram of supplementing a rectangular area into a square area according to an embodiment of the present application.

As shown in FIG. 4 and FIG. 5, for the preset areas A21'-A24', each rectangular area can be supplemented into a square area; then, a range within the monitored scene corresponding to the square area after supplementation can be captured by the PTZ camera, to obtain a capture posture and capture focal length for capturing the range corresponding to the square area after supplementation; and a candidate capture posture and candidate capture focal length for each of the preset areas A21'-A24' can be determined based on the capture posture and capture focal length for capturing the range corresponding to the square area.

Figure 6:
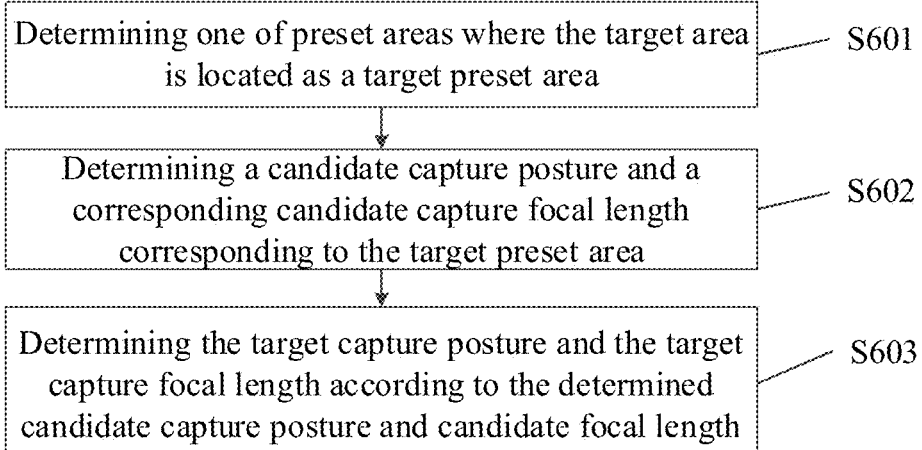
FIG. 6 is a schematic flowchart of an implementation for determining a target capture posture and a target capture focal length according to the present application.

A specific implementation for determining the target capture posture and target capture focal length described in the above step S202 will be described in details below with reference to specific examples. FIG. 6 shows a schematic flowchart of an implementation manner for determining the target capture posture and target capture focal length according to the target area according to the present application. As shown in FIG. 6, the method may include:

S601: determining one of preset areas where the target area is located as a target preset area;

S602: determining a corresponding candidate capture posture and a corresponding candidate capture focal length according to the target preset area; and S603: determining the above-mentioned target capture posture and target capture focal length according to the determined candidate capture posture and candidate focal length.

In the embodiment of the present application, the candidate capture posture and candidate capture focal length corresponding to each preset areas may be determined in advance, and may be used to calculate and generate the target capture posture and target capture focal length, according to a relationship between the target area and the target preset area.

The capture posture and capture focal length are capture parameters of the PTZ camera. The capture posture of the PTZ camera may include a horizontal rotation angle and a vertical rotation angle. The horizontal rotation angle is a rotation angle of the PTZ camera along the horizontal direction, and the vertical rotation angle is the rotation angle of the PTZ camera along the vertical direction. The horizontal rotation angle and vertical rotation angle together determine the capture position of the PTZ camera. In some embodiments, the capture focal length of the PTZ camera may be a zoom factor. The PTZ camera can adjust the focal length according to the zoom factor to adjust the clarity of a captured image.

In the embodiment of the present application, in the above step S601, from the acquired panoramic image of the monitored scene, a preset area where the target area is located may be determined according to the position of the target area in the panoramic image, and the preset area may be taken as the target preset area.

Figure 7A:
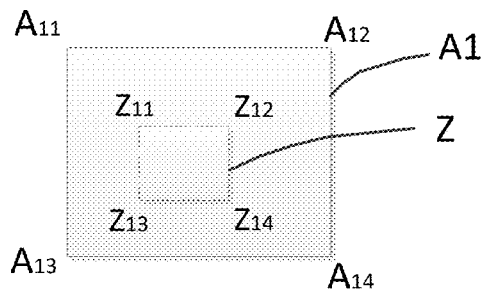
FIGS. 7A-7C are schematic diagrams of implementations of positional relationships between a target area and target preset areas according to the present application.
Figure 7B:
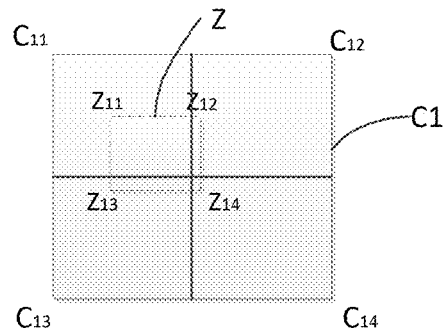
Figure 7C:
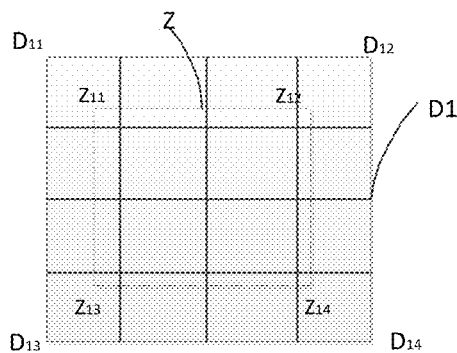

As shown in FIG. 3, the foregoing steps have divided the panoramic image into at least two levels of preset areas of different sizes. On this basis, the target area of any size and located at any position will fall within a certain preset area. As shown in FIG. 7A, the target area Z falls within the first-level preset area A1, and thus the preset area where the target area Z is located is the first-level preset area A1. As shown in FIG. 7B, the target area Z falls into the second-level preset area C1, and thus the preset area where the target area Z is located is the second-level preset area C1. As shown in FIG. 7C, the target area Z falls within the fourth-level preset area D1, and thus the preset area where the target area Z is located is the four-level preset area D1.

In the embodiment of the present application, according to the panoramic image, the panoramic image is divided into at least two preset areas, and the candidate capture posture and candidate capture focal length corresponding to each preset area are determined in advance, so that no matter how many target areas there are, the preset areas where each target area is located can fall into any preset area, and the capture posture and capture focal length for the each target area can be generated quickly using the candidate capture posture and candidate capture focal length corresponding to each preset area that are determined in advance, so as to increase the processing speed.

In the embodiment of the present application, since the candidate capture posture and candidate capture focal length corresponding to each preset area are determined in advance, in step S602, once the target preset area where the target area is located is determined, the candidate capture posture and candidate capture focal length corresponding to the target preset area can be determined.

Figure 8A:
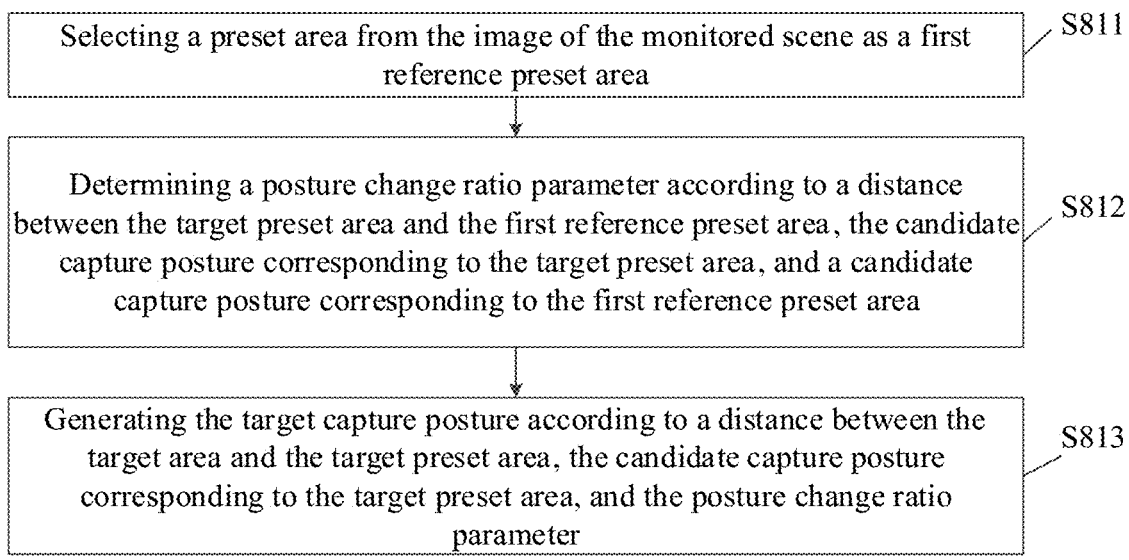
FIGS. 8A-8B are schematic flowcharts of implementations for generating a target capture posture and a target capture focal length according to the present application.
Figure 8B:
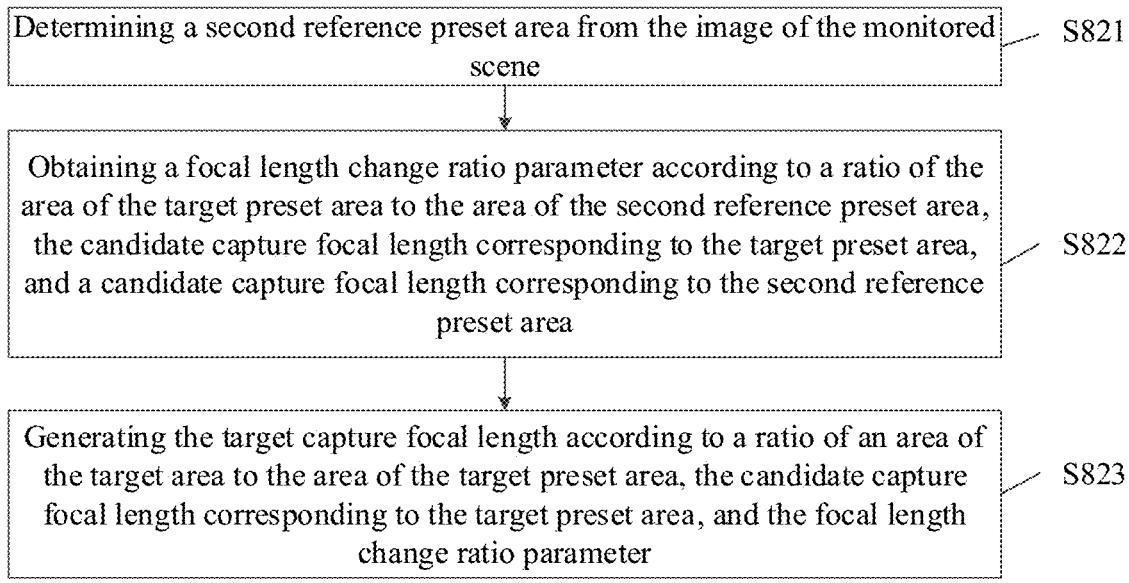

FIG. 8A shows a schematic flowchart of an implementation for determining the above-mentioned target capture posture according to the determined candidate capture posture corresponding to the target preset area as described in the above-mentioned step S603 of the present application. FIG. 8B shows a schematic flowchart of an implementation for determining the above-mentioned target capture focal length according to the determined candidate capture focal length corresponding to the target preset area as described in the above-mentioned step S603 of the present application.

As shown in FIG. 8A, determining the above-mentioned target capture posture according to the determined candidate capture posture corresponding to the target preset area, as described in the embodiment of the present application, may include:

S811: selecting a preset area from the image of the monitored scene as a first reference preset area, the first reference preset area being different from the target preset area;

S812: determining a posture change ratio parameter according to a distance between the target preset area and the first reference preset area, the candidate capture posture corresponding to the target preset area, and a candidate capture posture corresponding to the first reference preset area; and S813: generating the target capture posture according to a distance between the target area and the target preset area, the candidate capture posture corresponding to the target preset area, and the posture change ratio parameter.

In the embodiment of the present application, as mentioned above, since the capture posture of the PTZ camera includes the horizontal rotation angle and vertical rotation angle, when selecting the above-mentioned first reference preset area, a positional relationship between the first reference preset area and the target preset area is related to whether the capture parameter in the horizontal direction or the capture parameter in the vertical direction is determined. For example, if the capture parameter in the horizontal direction, i.e., the horizontal rotation angle, is determined, a displacement in the horizontal direction between the first reference preset area and the target preset area cannot equal zero. Similarly, if the capture parameter in the vertical direction, i.e., the vertical rotation angle, is determined, a displacement in the vertical direction between the first reference preset area and the target preset area cannot be zero.

Particularly, in the embodiment of determining the target horizontal rotation angle of the PTZ camera, the above-mentioned distance between the target preset area and the first reference preset area is a horizontal distance between the target preset area and the first reference preset area; and the above-mentioned distance between the target area and the target preset area is a horizontal distance between the target area and the target preset area. The horizontal distance between the target preset area and the first reference preset area cannot be zero. In the embodiment of determining the target vertical rotation angle of the PTZ camera, the above-mentioned distance between the target preset area and the first reference preset area is a vertical distance between the target preset area and the first reference preset area; and the above-mentioned distance between the target area and the target preset area is a vertical distance between the target area and the target preset area. The vertical distance between the target preset area and the first reference preset area cannot be zero.

Optionally, in some embodiments of the present application, a preset area adjacent to the above-mentioned target preset area may be selected as the first reference preset area.

Preset areas adjacent to the above-mentioned target preset area refers to one of the following: a right preset area and a lower preset area of the target preset area; the right preset area and a upper preset area of the target preset area; a left preset area and the lower preset area of the target preset area; and the left preset area and the upper preset area of the target preset area.

In order to simplify the implementation, regarding preset areas located at other positions of the panoramic image, the adjacent preset areas may be uniformly selected as the right preset area and the lower preset area. In this case, for the column of preset areas on the far right of the panoramic image, the adjacent preset areas may be selected as the left preset areas and the lower preset areas. It is also possible that, in the step of dividing the panoramic image into multiple preset areas, a column of standby preset areas is added to the far right of the panoramic image, a range within the monitored scene corresponding to each standby preset area is captured with the PTZ camera, a candidate capture posture and candidate capture focal length for each standby preset area are determined based on a capture posture and capture focal length for the range corresponding to the standby preset area when it is captured by the PTZ camera. When the preset area where the target area is located is one of the preset areas on the far right, the adjacent preset area may be selected as the candidate preset area on the right side of the target area. Similarly, for a row of preset areas on the lowermost side of the panoramic image, the adjacent preset area may be determined using one of the above two optional solutions.

In some possible embodiments, when the first reference preset area and the target preset area are adjacent preset areas, the above-mentioned target capture posture may be calculated and generated according to following equations (1)-(2). The target capture posture includes the target horizontal rotation angle and the target vertical rotation angle.

Firstly, in the embodiment of the present application, in the process of determining the target horizontal rotation angle and the target vertical rotation angle of the PTZ camera, there is a need to use position information of each vertex of the target preset area. For ease of measurement of the position of each vertex of the target preset area, a Cartesian coordinate system is introduced. Usually, the lower left corner of the image of the monitored scene may be taken as the origin of the coordinate system, and the X axis and the Y axis are set according to the directions for the dividing the preset areas. As shown in FIG. 3, the lower left corner vertex (the boundary point 16) of the preset area A21 can be taken as the origin of the rectangular coordinate system, the side determined by the boundary points 17, 18, 19 and 20 can be taken as the X-axis of the rectangular coordinate system, the side determined by the boundary points 14, 12, 10, 8, 6, and 1 can be taken as the Y-axis of the rectangular coordinate system. As such, the position of each vertex of each preset area can be represented by coordinates. For example, if the resolution of the image information of the monitored scene is determined to be 720*1080, the coordinates of the four vertices of the preset area A1 can be expressed as (0,1080), (180,1080), (0,900) and (180,900) in sequence. For another example, the coordinates of the boundary point 5 can be represented as (720, 1080), the coordinate point of the boundary point 16 may be (0, 0), the coordinate point of the boundary point 20 may be (720, 0), and so on.

Next, the target horizontal rotation angle and the target vertical rotation angle can be determined according to the positional relationship between the target area and the target preset area.

Let the target area be denoted as T, $T_1$ represent the first vertex of the target area, $T_2$ represent the second vertex of the target area, and $T_3$ represent the third vertex of the target area. Among them, $T_1$ and $T_2$ have different abscissas, which are denoted as $X_{T1}$ and $X_{T2}$ respectively. $T_1$ and $T_2$ may have the same ordinate or different ordinates. Among them, $T_1$ and $T_3$ have different ordinates, which are denoted as $Y_{T1}$ and $Y_{T3}$ respectively. $T_1$ and $T_3$ may have the same abscissa or different abscissas.

Let the target preset area be denoted as D, $D_1$ represent the first vertex of the target preset area, $D_2$ represents the second vertex of the target preset area, and $D_3$ represents the third vertex of the target preset area. Among them, $D_1$ and $D_2$ have different abscissas, which are denoted as $X_{D1}$ and $X_{D2}$. $D_1$ and $D_2$ may have the same ordinate or different ordinates. Among them, $D_1$ and $D_3$ have different ordinates, which are denoted as $Y_{D1}$ and $Y_{D3}$, respectively. $D_1$ and $D_3$ may have the same abscissa or different abscissas.

Further, let $P_D$ represent the horizontal rotation angle of the target preset area D, and $P_{DJ}$ represent the horizontal rotation angle corresponding to the preset area adjacent to the target preset area D in the horizontal direction (i.e., the X-axis direction), that is, the preset area DI is located on the right or left side of the preset area D. Let $T_D$ represent the vertical rotation angle of the target preset area D, $T_{DJ}$ represent the vertical rotation angle corresponding to the preset area adjacent to the target preset area D in the vertical direction (i.e., the Y-axis direction), that is, the preset area DJ is located on the upper or lower side of the preset area D.

Under the above assumptions, the target horizontal rotation angle $P_T$ when the PTZ camera is capturing the target area can be calculated by the following equation (1):

$$P_T = P_{DI} - (X_{T1} + X_{T2})/(X_{D1} + X_{D2}) \times (P_{DI} - P_D) \qquad (1)$$

In equation (1), it can be understood that $(X_{T1} + X_{T2})/2$ represents the abscissa of the midpoint of the target area, $(X_{D1} + X_{D2})/2$ represents the abscissa of the midpoint of the target preset area, and thus $(X_{T1} + X_{T2})/(X_{D1} + X_{D2})$ represents a change ratio of the horizontal rotation angle of the PTZ camera from the target area to the target preset area, that is, the above-mentioned change ratio parameter. $(P_{DI} - P_D)$ represents the total change of the target horizontal rotation angle of the PTZ camera from the target preset area D to the preset area DI. Thereby, $(X_{T1} + X_{T2})/(X_{D1} + X_{D2}) \times (P_{DI} - P_D)$ represents the change of the target horizontal rotation angle of the PTZ camera from the target area T to the preset area DI. Therefore, the target horizontal rotation angle $P_T$ of the PTZ camera when it is capturing the target area can be obtained by the above equation (1).

Similarly, under the above assumptions, the target vertical rotation angle $T_T$ when the PTZ camera is capturing the target area can be calculated by the following equation (2):

$$T_T = T_{DJ} + (Y_{T1} + Y_{T3})/(Y_{D1} + Y_{D3}) \times (T_D - T_{DJ}) \qquad (2)$$

In equation (2), it can be understood that $(Y_{T1} + Y_{T3})/2$ represents the ordinate of the midpoint of the target area, $(Y_{D1} + Y_{D3})/2$ represents the ordinate midpoint of the target preset area, and thus $(Y_{T1} - Y_{T3})/(Y_{D1} + Y_{D3})$ represents the change ratio of the vertical rotation angle of the PTZ camera from the target area to the target preset area, that is, the above-mentioned change ratio parameter. $(T_D - T_{DJ})$ represents the total change of the target vertical rotation angle of the PTZ camera from the preset area DJ to the target preset area D. Thereby, $(Y_{T1} + Y_{T3})/(Y_{D1} + Y_{D3}) \times (T_D - T_{DJ})$ represents the change of the target vertical rotation angle of the PTZ camera from the preset area DJ to the target area T. Therefore, the target vertical rotation angle $T_T$ of the PTZ camera when it is capturing the target area can be obtained by the above equation (2).

As shown in FIG. 8B, the method for determining the above-mentioned target capture focal length according to the candidate capture focal length corresponding to the target preset area, as described in the embodiment of the present application, may include:

S821: determining a second reference preset area from the image of the monitored scene, the second reference preset area including the target preset area and an area of the second reference preset area being larger than an area of the target preset area, or alternatively, the target preset area including the second reference preset area and an area of the target preset area being larger than an area of the second reference preset area;

S822: obtaining a focal length change ratio parameter according to a ratio of the area of the target preset area to the area of the second reference preset area, the candidate capture focal length corresponding to the target preset area, and a candidate capture focal length corresponding to the second reference preset area; and S823: generating the target capture focal length according to a ratio of an area of the target area to the area of the target preset area, the candidate capture focal length corresponding to the target preset area, and the focal length change ratio parameter.

Optionally, in some embodiments of the present application, the panoramic image may be divided into at least two levels of preset areas according to size; according to the preset area where the target area is located, a preset area that is different from the target area by one or more levels can be determined, and taken as the second reference preset area; after that, a candidate capture focal length corresponding to the above second reference preset area can be determined, and then the capture focal length corresponding to the target area can be calculated and generated according to the candidate capture focal length corresponding to the target preset area the candidate capture focal length corresponding to the above second reference preset area.

In some possible embodiments, the target capture focal length can be calculated and generated according to an equation (3), where the target capture focal length may be a zoom factor.

Let the target area be denoted as T, the target preset area be denoted as D, and $Z_D$ represents a zoom factor corresponding to the target preset area, $Z_M$ represents a zoom factor corresponding to the second reference preset area In the embodiment of the present application, the target zoom factor $Z_T$ can be calculated by the following equation:

$$Z_T = Z_D - Z_{a3} \times (Z_M - Z_D) \qquad (3)$$

In equation (3), $Z_{a1} = |X_{T1} + X_{T2}|/|X_{D1} + X_{D2}|$; $Z_{a2} = |Y_{T1} + Y_{T3}|/|Y_{D1} + Y_{D3}|$; and $Z_{a3}$ equals the larger one of $Z_{a1}$ and $Z_{a2}$. It can be seen that the above $Z_{a3}$ can be regarded as the above-mentioned focal length change ratio parameter; $(Z_M - Z_D)$ is the total amount of focal length change of the PTZ camera from the target preset area D to the second reference preset area; and $Z_{a3} \times (Z_M - Z_D)$ is the focal length change of the PTZ camera from the target area T to the target preset area D. Therefore, the target capture focal length of the PTZ camera when it is capturing the target area can be obtained by the above equation (3).

In combination with FIG. 3 and FIG. 7A, in an optional embodiment, according to the panoramic image, the 20 boundary points of the panoramic image can be determined, and the panoramic image can be divided into 24 first-level preset areas A1-A24. A range in the monitored scene corresponding to each first-level preset area can be captured by the PTZ camera; and then, a candidate capture posture and candidate capture focal length for each first-level preset area can be determined based on a capture posture and capture focal length for capturing the range corresponding to the first-level preset area.

The target area Z is determined according to the panoramic image, and according to the size of the target area Z and its position in the panoramic image, it is determined that the target area Z falls within the first-level preset area A1, that is, the preset area where the target area is located is the first-level preset area A1; after that, a horizontal rotation angle $P_{A1}$, vertical rotation angle $T_{A1}$, zoom factor $Z_{A1}$ corresponding to the first-level preset area A1 are determined, for example, $P_{A1}T_{A1}Z_{A1}=(0,0.8,0.8)$; according to the first-level preset area A1, the first-level preset area A2 and the first-level preset area A5 adjacent to the first-level preset area A1 are determined; according to the first-level preset area A2, a horizontal rotation angle $P_{A2}$, vertical rotation angle $T_{A2}$, zoom factor $Z_{A2}$ corresponding to the first-level preset area A2 are determined, for example, $P_{A2}T_{A2}Z_{A2}=(0.25,0.8,0.8)$; and according to the first-level preset area A5, a horizontal rotation angle $P_{A5}$, vertical rotation angle $T_{A5}$, zoom factor $Z_{A5}$ corresponding to the first-level preset area A5 are determined, for example, $P_{A5}T_{A5}Z_{A5}=(0, 0.67, 0.8)$.

In addition, coordinates of each boundary point can be determined according to the resolution of the panoramic image. In this embodiment, it is determined that the resolution of the panoramic image information is 720*1080, and then coordinates of the boundary point 1 are (0, 1080), coordinates of the boundary point 5 are (720, 1080), a coordinate point of the boundary point 16 is (0,0), a coordinate point of the boundary point 20 is (720,0); for the first-level preset area A1, coordinates of its four vertices are $A_{11}$ (0,1080), $A_{12}$ (180, 1080), $A_{13}$ (0,900), and $A_{14}$ (180, 900), respectively; and for the target area Z, coordinates of its three vertices are $Z_{11}$ (45,1020), $Z_{12}$ (135, 1020), and $Z_{13}$ (45,948), respectively.

In addition, the maximum value of the horizontal rotation angle, the maximum value of the vertical rotation angle, and the maximum value of the zoom factor of the PTZ camera are known. In this embodiment, set $P_{max}T_{max}Z_{max}=(1,1,1)$, and then $Z_M=1$.

According to the determined parameters, the capture posture and capture focal length for the target area Z can be calculated using equations (1)-(5) to obtain:

$$P_Z=0.25-((45+135)/(0+180))\times(0.25-0)=0 \quad (6)$$

$$T_Z=0.67+((1020+948)/(1080+900))\times(0.8-0.67)=0.799 \quad (7)$$

$$Z_Z=1-1\times(1-0.8)=0.8 \quad (8)$$

After the calculation, it is obtained the horizontal rotation angle of the target area Z, $P_Z=0$, the vertical rotation angle of the target area Z, $T_Z=0.799$, the zoom factor of the target area Z, $Z_Z=0.8$, that is, $P_ZT_ZZ_Z=(0, 0.799, 0.8)$ After calculating and generating the horizontal rotation angle, vertical rotation angle and zoom factor of the target area, the PTZ camera can be controlled to capture according to the generated horizontal rotation angle, vertical rotation angle and zoom factor, so that the PTZ camera can capture the range within the monitored scene corresponding to the target area, capture objects in the range, so as to achieve the purpose of capturing any object in the monitored scene using the PTZ camera.

In the embodiment of the present application, in the process of determining the target area from the acquired image of the monitored scene, there may be a situation in which a quantity of target areas initially determined is greater than a quantity of PTZ camera(s). In this case, in order to monitor effectively, the initially determined target areas should be merged to determine the final target area(s) to be monitored, so that the quantity of the target areas that are finally determined to be monitored is less than or equal to the quantity of PTZ camera(s).

Figure 9:
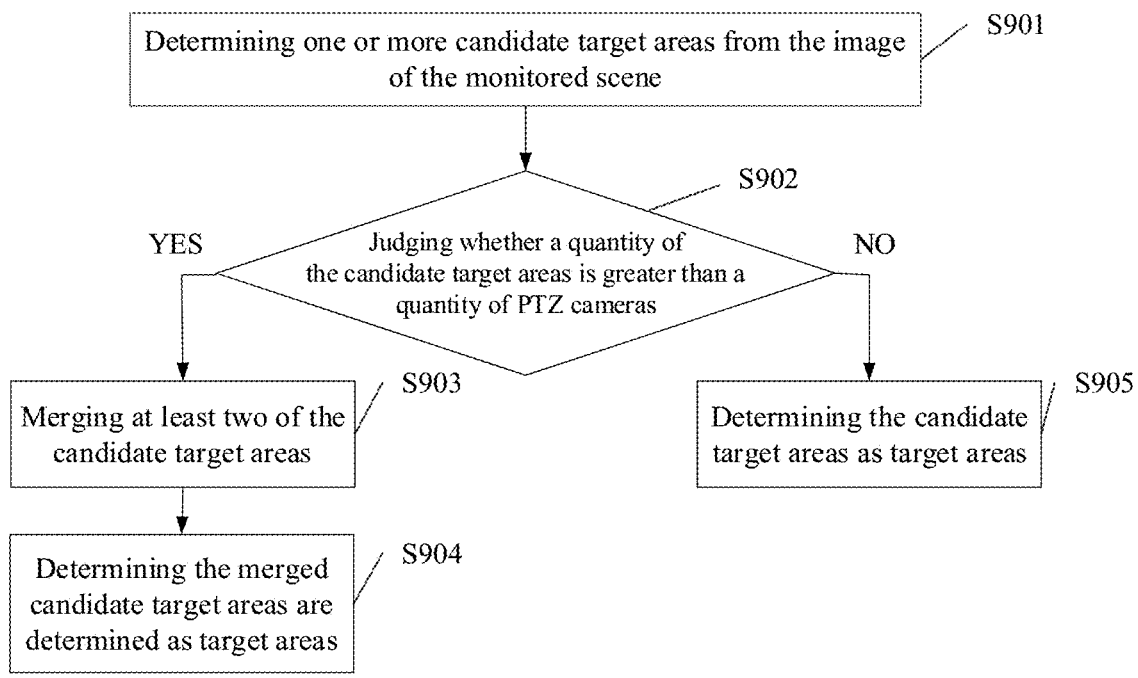
FIG. 9 is a schematic flowchart of an implementation for determining a target area according to the present application.

FIG. 9 shows a schematic flowchart of an implementation for determining the target area to be monitored from the acquired image of the monitored scene described in the present application. As shown in FIG. 9, determining the target area to be monitored from the acquired image of the monitored scene may include:

S901: determining one or more candidate target areas (i.e., at least one candidate target area) from the image of the monitored scene; and S902: judging whether a quantity of the candidate target areas is greater than a quantity of PTZ camera(s), and w under a condition that the quantity of the candidate target areas is greater than the quantity of PTZ cameras, proceeding to S903; otherwise, proceeding to S905.

In the embodiment of the present application, in order to monitor effectively, the quantity of the set PTZ camera(s) is at least one.

S903: at least two of the candidate target areas are merged, so that a quantity of merged candidate target areas is equal to the quantity of PTZ camera(s).

S904: the merged candidate target areas are determined as target area(s).

S905: the above candidate target areas are determined as target area(s).

In the embodiment of the present application, the above-mentioned candidate target areas are area(s) worthy of attention as determined according to the image of the monitored scene, that is, area(s) that need to be monitored by PTZ camera(s). Particularly, according to the acquired image of the monitored scene and using the image recognition processing technology, a plurality of candidate target areas that need to be monitored by the PTZ camera(s) can be determined by various methods described above. Usually, it is required that each candidate target area is monitored by a single PTZ camera. Therefore, when the quantity of PTZ camera(s) is limited, it may be necessary to merge some candidate target areas among the plurality of candidate target areas, to determine the target area to be monitored by each PTZ camera.

In one case, if the quantity of candidate target area(s) is less than or equal to the quantity of PTZ camera(s), the candidate target area(s) can be determined as target area(s), and for each target area, a target capture posture and target capture focal length can be determined respectively, and a corresponding PTZ camera can be controlled to capture according to the above target capture posture and target capture focal length.

In another case, if the quantity of candidate target area(s) is greater than the quantity of PTZ camera(s), at least two candidate target areas in the above candidate target areas need to be merged, so that the quantity of merged candidate target area(s) is equal to the quantity of PTZ camera(s); after that, the merged candidate target area(s) can be determined as target area(s), and a corresponding relationship between the target area(s) and the PTZ camera(s) can be established; and then, for each target area, a the above target capture posture and target capture focal length can be determined, and a PTZ camera can be controlled to capture according to the above target capture posture and target capture focal length.

The method for merging candidate target areas will be described in details below with reference to specific examples.

In a possible embodiment of the present application, at least two candidate target areas may be merged based on a distance between the candidate target areas, and S903 may include:

determining a distance between every two candidate target areas; and merging the candidate target areas sequentially, in an order of the above distances from small to large, until a quantity of the merged candidate target area(s) is equal to the quantity of PTZ camera(s).

That is, when it is judged that the quantity of candidate target area(s) is greater than the quantity of PTZ camera(s), the distance between the every two candidate target areas can be determined; after that, the closest two candidate target areas can be selected from them, and can be merged into one candidate target area. After the merging process, it is judged whether the quantity of candidate target area(s) is equal to the quantity of PTZ camera(s); if they are equal, the candidate target area(s) after the merging process can be determined as target area(s); and if not, the merging process is continued until the quantity of candidate target area(s) is equal to the quantity of PTZ camera(s).

In the above-mentioned merging process, it may happen that after distance between every two candidate target areas is determined, there are multiple groups of closest candidate target areas. That is, there are at least two groups of candidate target areas, each group of candidate target areas includes two candidate target areas to be merged, and the distances between the two candidate target areas to be merged in each group are equal, and in this case, at least two groups of candidate target areas can be merged according to a merging priority, which includes:

the first priority, where sizes of the two candidate target areas to be merged are both smaller than a preset area threshold;

the second priority, where a size of one candidate target area to be merged is greater than the area threshold, and a size of the other candidate target area to be merged is smaller than the area threshold; and the third priority, where sizes of the two candidate target areas to be merged are both larger than the area threshold.

Figure 10:
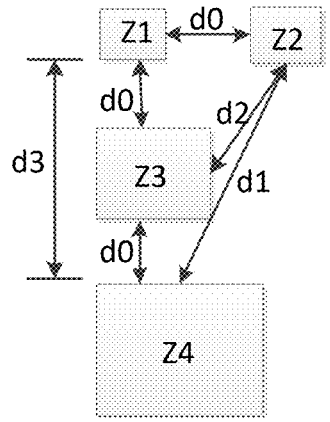
FIG. 10 is a schematic diagram of a positional relationship of candidate target areas to be merged according to the present application.

As shown in FIG. 10, candidate target areas Z1, Z2, Z3, and Z4 are determined from the image. It is assumed that the quantity of PTZ cameras is three, and thus the candidate target areas Z1, Z2, Z3, and Z4 need to be merged into three candidate target areas. Firstly, a distance between every two candidate target areas can be determined, to obtain that the distance between the candidate target area Z1 and the candidate target area Z2, the distance between the candidate target area Z1 and the candidate target area Z3, and the distance between the candidate target area Z3 and the candidate target area Z4 are all d0, the distance between the candidate target area Z2 and the candidate target area Z4 is d1, and the distance between the candidate target area Z2 and the candidate target area Z3 is d2, the distance between the candidate target area Z1 and the candidate target area Z4 is d3. And it is determined that among d0, d1, d2 and d3, d0 is the minimum distance. Further, sizes of the candidate target areas Z1, Z2, Z3, and Z4 can be determined, and it is obtained that the sizes of the candidate target area Z1 and the candidate target area Z2 are both smaller than a set area threshold. The candidate target area Z1 and the candidate target area Z2 are then merged into one candidate target area according to a merging priority.

The determined distance between every two candidate target areas can be a distance between the nearest sides of the two candidate target areas, or a distance between the farthest sides of the two candidate target areas, or a distance between the farthest vertices of the two candidate target areas, which is not specifically limited, as long as the bases for calculating the distances are the same.

In another possible embodiment of the present application, at least two candidate target areas may be merged based on areas of the candidate target areas too, and S903 may specifically include: pre-merging every two candidate target areas to obtain pre-merged candidate target areas; determining an area of each of the pre-merged candidate target areas; selecting a pre-merged candidate target area whose area is smallest; and merging two candidate target areas corresponding to the pre-merged candidate target area whose area is smallest.

In another possible embodiment of the present application, in order to improve the merging efficiency, the determined candidate target areas may be merged based on areas of the candidate target areas and a distance between the candidate target areas, and S903 may specifically include: determining an area of each of the candidate target areas; selecting a candidate target area whose area is smallest; determining a first distance between the candidate target area whose area is smallest and each of other candidate target areas; selecting a candidate target area for which the first distance is shortest; and merging the candidate target area whose area is smallest with the candidate target area for which the first distance is shortest.

In another possible embodiment of the present application, the at least two candidate target areas may be merged based on areas of the candidate target areas and a distance between subsequent target areas, and S903 may specifically include: determining an area of each of the candidate target areas; selecting a candidate target area whose area is smallest; determining a first distance between the candidate target area whose area is smallest and each of other candidate target areas; selecting a candidate target area for which the first distance is shortest; pre-merging the candidate target area whose area is smallest with the candidate target area for which the first distance is shortest, to obtain a pre-merged candidate target area; determining an area of the pre-merged candidate target area; comparing the area of the pre-merged candidate target area with a preset area threshold; under a condition that the area of the pre-merged candidate target area is smaller than or equal to the area threshold, merging the candidate target area whose area is smallest with the candidate target area for which the first distance is shortest; under a condition that the area of the pre-merged candidate target area is larger than the area threshold: pre-merging the candidate target area whose area is smallest with each of the other candidate target areas except the candidate target area for which the first distance is shortest sequentially, in an order of first distances from short to long, and when an area of any pre-merged candidate target area is smaller than or equal to the preset area threshold, merging two candidate target areas that are pre-merged to obtain the pre-merged candidate target area.

Under a condition that areas of all pre-merged candidate target areas are larger than the area threshold, a candidate target area is selected from the other candidate target areas except the candidate target area for which the first distance is shortest sequentially, in an order of areas from small to large; a second distance between the selected candidate target area and each of the other candidate target areas is determined; the selected candidate target area is pre-merged with each of the other candidate target areas sequentially, in an order of second distances from short to long; and when an area of any pre-merged candidate target area is smaller than or equal to the preset area threshold, two candidate target areas that are pre-merged to obtain the pre-merged candidate target area are merged.

In addition to the above-mentioned method for merging candidate target areas, in some other possible embodiments of the present application, the above-mentioned target area(s) may also be determined based on areas where a moving object is located and the quantity of PTZ camera(s), and S101 may include:

judging whether an quantity of the areas where the moving object is located is greater than the quantity of PTZ camera(s);

under a condition that the quantity of the areas where the moving object is located is greater than the quantity of PTZ camera(s):

determining moving ranges of the moving object; ranking priorities of the areas where the moving object is located in an order of the moving ranges of the moving object from large to small; and selecting, in an order of the priorities from high to low and according to the quantity of PTZ camera(s), the areas where the moving object is located as target areas;

or determining the moving ranges of the moving object; determining candidate areas where the moving object is located for which the moving ranges of the moving object are greater than a preset moving threshold, according to the moving ranges of the moving object; judging whether an quantity of the candidate areas where the moving object is located is greater than the quantity of PTZ cameras; under a condition that the quantity of the candidate areas where the moving object is located is greater than the quantity of PTZ cameras, merging the candidate areas where the moving object is located, so that a quantity of the merged candidate areas where the moving object is located is equal to the quantity of PTZ cameras; and determining the merged candidate areas where the moving object is located as the target area In this embodiment, the monitored object is the moving object, and an area where the moving object is located in the panoramic image is the target area. When it is determined that there are multiple areas where the moving object is located in the panoramic image, and the quantity of PTZ camera(s) is limited, the target area(s) to be monitored can be determined according to the moving ranges of the moving object.

One approach is as follows: firstly, ranking priorities of the area(s) where the moving object is located in an order of the moving ranges of the moving object from large to small; and then selecting, according to the quantity of PTZ camera(s), the area(s) where the moving object is located as target area(s).

Another approach is to set a moving threshold. Firstly, candidate area(s) where the moving object is located for which the moving range(s) of the moving object are greater than the moving threshold; under a condition that the quantity of the determined candidate area(s) where the moving object is located is greater than the quantity of PTZ camera(s), at least two candidate areas where the moving object is located are merged, so that a quantity of the merged candidate area(s) where the moving object is located is equal to the quantity of PTZ camera(s); and determining the merged candidate areas where the moving object is located as the target area. For the method of the merging process, reference may be made to the method for merging process described in the foregoing embodiments, and it is not repeated herein.

In some possible embodiments, if there are multiple candidate target areas determined from the image of the monitored scene, and the quantity of candidate target areas is greater than a set threshold for a quantity of areas, in order to ensure the monitoring effect, a wide-angle camera can be used cooperatively to monitor the monitored scene.

Then, S101 may include:
determining at least two candidate target areas from the image;
judging whether a quantity of candidate target areas is greater than the set threshold for the quantity of areas;
under a condition that the quantity of candidate target areas is greater than the set threshold for the quantity of areas, dividing the image into a first area and a second area, according to sharpness of photos captured by the wide-angle camera, wherein the sharpness of photos captured by the wide-angle camera reaches a preset sharpness threshold in the first area;
controlling the wide-angle camera to capture in the first area; and
determining the second area as the target area.

In this embodiment, at least two candidate target areas are determined from the acquired image; and when it is determined that the quantity of the candidate target areas is greater than the set threshold for the quantity of areas, since the quantity of target areas is large and the target areas are distributed in the image, in order to achieve the monitoring effect of comprehensive coverage, the wide-angle camera and the PTZ camera(s) can be used simultaneously to monitor the monitored scene. In this case, the image is divided into the first area and the second area, the first area is determined according to a sharp capture range of the wide-angle camera, the second area is regarded as the target area, and the PTZ camera is used to capture the range in the monitored scene corresponding to the target area, where the sharp capture range of the wide-angle camera refers to: in the sharp capture range, the sharpness of photos captured by the wide-angle camera can reach the preset sharpness threshold.

In practical applications, a wide-angle camera can be installed above a blackboard in the front of a classroom. According to the sharp capture range of the wide-angle camera, it can be determined that the wide-angle camera is used to capture the front area of the classroom (such as the first three rows of desks), and the PTZ camera is used to capture the rear area of the classroom. When there are a large number of students to be monitored in the classroom and they are distributed in different positions in the classroom, the monitoring effect of full coverage and good image sharpness can be achieved through the cooperation of the wide-angle camera and the PTZ camera.

Figure 11:
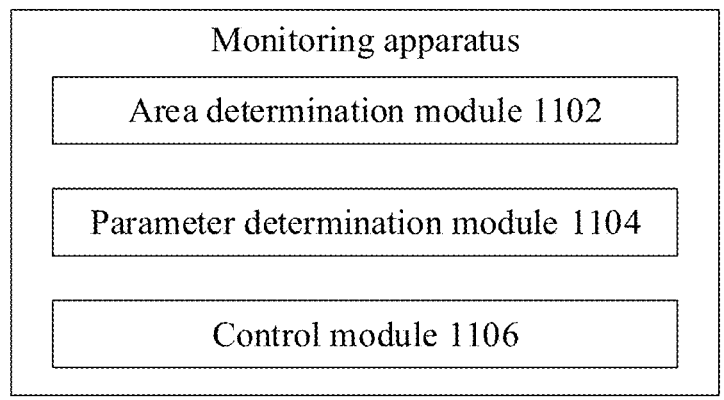
FIG. 11 is a schematic structure diagram of an implementation of a monitoring apparatus according to the present application.

FIG. 11 is a schematic structural diagram of an apparatus of an embodiment of the present application. The monitoring apparatus includes:
an area determination module 1102, configured to determine a target area to be monitored from an acquired image of a monitored scene
a parameter determination module 1104, configured to determine a target capture posture and a target capture focal length according to the target area; and
a control module 1106, configured to control a PTZ camera to capture according to the target capture posture and the target capture focal length.

In an implementation, the area determination module 1102 may include:
an acquisition unit, configured to acquire a panoramic image of the monitored scene; and
a determination unit, configured to determine the target area according to the panoramic image.

In an implementation, the parameter determination module 1104 may include:
a dividing unit, configured to divide the panoramic image into at least two preset areas;
a candidate parameter determination unit, configured to determine a candidate capture posture and a candidate capture focal length corresponding to each of the preset areas;
a target preset area determination unit, configured to determine a preset area where the target area is located, as a target preset area;
a first parameter determination unit, configured to determine a first candidate capture posture and a first candidate capture focal length corresponding to the target preset area;

a parameter generating unit, configured to generate the target capture posture and the target capture focal length according to the first candidate capture posture and the first candidate capture focal length.

In an implementation, the parameter generating unit may include:
a first reference area determination subunit, configured to select a preset area from the image of the monitored scene as a first reference preset area, the first reference preset area being different from the target preset area;
a posture change ratio parameter determination subunit, configured to determine a posture change ratio parameter according to a distance between the target preset area and the first reference preset area, the candidate capture posture corresponding to the target preset area, and a candidate capture posture corresponding to the first reference preset area; and
a first calculation subunit, configured to generate the target capture posture according to a distance between the target area and the target preset area, the candidate capture posture corresponding to the target preset area, and the posture change ratio parameter.

The parameter generating unit may further include:
a second reference area determination subunit, configured to determine a second reference preset area from the image of the monitored scene, the second reference preset area comprising the target preset area and an area of the second reference preset area being larger than an area of the target preset area, or alternatively, the target preset area comprising the second reference preset area and an area of the target preset area being larger than an area of the second reference preset area;
a focal length change ratio determination subunit, configured to obtain a focal length change ratio parameter according to a ratio of the area of the target preset area to the area of the second reference preset area, the candidate capture focal length corresponding to the target preset area, and a candidate capture focal length corresponding to the second reference preset area; and
a second calculation subunit, configured to generate the target capture focal length according to a ratio of an area of the target area to the area of the target preset area, the candidate capture focal length corresponding to the target preset area, and the focal length change ratio parameter.

In an implementation, the area determination module 1102 may further include:
a region quantity determination unit, configured to determine one or more candidate target areas from the image;
a judging unit, configured to judge whether a quantity of the candidate target areas is greater than a quantity of PTZ cameras;
a merging unit, configured to merge the determined candidate target areas, so that a quantity of merged candidate target areas is not greater than the quantity of PTZ cameras, under a condition that the quantity of the candidate target areas is greater than the quantity of PTZ cameras;
a target area determination unit, configured to determine the merged candidate target areas as target areas.

In an implementation, the merging unit may include:
a pre-merging module, configured to pre-merge every two candidate target areas to obtain pre-merged candidate target areas;
an area determination module, configured to determine an area of each of the pre-merged candidate target areas;
a selection module, configured to select an area of each of the pre-merged candidate target areas
a merging module, configured to merge two candidate target areas corresponding to the pre-merged candidate target area whose area is smallest.

In an implementation, the merging unit may include:
a target area area determination module, configured to determine an area of each of the candidate target areas;
a selection module, configured to select a candidate target area whose area is smallest;
a distance determination module, configured to determine a first distance between the candidate target area whose area is smallest and each of other candidate target areas;
a selection module, configured to select a candidate target area for which the first distance is shortest;
a merging module, configured to merge the candidate target area whose area is smallest with the candidate target area for which the first distance is shortest.

In an implementation, the merging unit includes:
a target area area determination module configured to determine an area of each of the candidate target areas;
a selection module, configured to select a candidate target area whose area is smallest;
a distance determination module, configured to determine a first distance between the candidate target area whose area is smallest and each of other candidate target areas;
a selection module, configured to select a candidate target area for which the first distance is shortest;
a pre-merging module, configured to pre-merge the candidate target area whose area is smallest with the candidate target area for which the first distance is shortest, to obtain a pre-merged candidate target area;
an area determination module, configured to determine an area of the pre-merged candidate target area;
a comparison module, configured to an area of the pre-merged candidate target area;
a merging module, configured to: under a condition that the area of the pre-merged candidate target area is smaller than or equal to the area threshold, merge the candidate target area whose area is smallest with the candidate target area for which the first distance is shortest; under a condition that the area of the pre-merged candidate target area is larger than the area threshold: pre-merge the candidate target area whose area is smallest with each of the other candidate target areas except the candidate target area for which the first distance is shortest sequentially, in an order of first distances from short to long, and when an area of any pre-merged candidate target area is smaller than or equal to the preset area threshold, merge two candidate target areas that are pre-merged to obtain the pre-merged candidate target area.

In an implementation, the merging unit may include:
a distance determination module, configured to determine a distance between every two candidate target areas; and
a merging module, configured to merge the candidate target areas sequentially, in an order of distances from small to large, until a quantity of the merged candidate target areas is not greater than the quantity of PTZ cameras.

In some embodiments, the determination unit may include:
a motion area determination subunit, configured to determine areas where a moving object is located according to a plurality of consecutive frames of a panoramic image; and a target area determination subunit, configured to determine the target area based on the areas where the moving object is located.

In some embodiments, the target area determination subunit is configured to:
judge whether an quantity of the areas where the moving object is located is greater than a quantity of PTZ cameras;
under a condition that the quantity of the areas where the moving object is located is greater than the quantity of PTZ cameras:
determine moving ranges of the moving object; ranking priorities of the areas where the moving object is located in an order of the moving ranges of the moving object from large to small; and selecting, in an order of the priorities from high to low and according to the quantity of PTZ cameras, the areas where the moving object is located as target areas; or
determine the moving ranges of the moving object; determining candidate areas where the moving object is located for which the moving ranges of the moving object are greater than a preset moving threshold, according to the moving ranges of the moving object; judging whether an quantity of the candidate areas where the moving object is located is greater than the quantity of PTZ cameras; under a condition that the quantity of the candidate areas where the moving object is located is greater than the quantity of PTZ cameras, merging the candidate areas where the moving object is located, so that a quantity of the merged candidate areas where the moving object is located is equal to the quantity of PTZ cameras; and determining the merged candidate areas where the moving object is located as the target area.

In some embodiments, the region determination module 1102 may further include:
a threshold judging unit, configured to judge whether a quantity of candidate target areas is greater than a set threshold of a quantity of areas;
an area dividing unit, configured to divide the image into a first area and a second area according to sharpness of photos captured by a wide-angle camera, under a condition that the quantity of candidate target areas is greater than the set threshold of the quantity of areas; wherein the sharpness of photos captured by the wide-angle camera reaches a preset sharpness threshold in the first area;
a wide-angle control unit, configured to control the wide-angle camera to capture;
a target area determination unit, configured to determine the second area as the target area.

The apparatuses in the above embodiments are configured to implement the corresponding methods in the foregoing embodiments, and have the beneficial effects of the corresponding method embodiments, which will not be repeated here.

In an embodiment of the present application, an electronic device is provided. The electronic device may include a memory, a processor, and computer programs stored on the memory and executable on the processor. The programs when executed by the processor cause the any of the above monitoring methods to be implemented.

In an embodiment of the present application, a non-transitory computer-readable storage medium is provided. The non-transitory computer-readable storage medium may have computer instructions stored thereon. The computer instructions may be configured to cause a computer to execute any of the above monitoring methods.

In an embodiment of the present application, a monitoring system is provided. The monitoring system may include a wide-angle camera, an electronic device and a PTZ camera; wherein
the wide-angle camera is configured to capture an image of a monitored scene; and
the electronic device is configured to determine a target area to be monitored from an acquired image of the monitored scene; determine a target capture posture and a target capture focal length according to the target area; and control the PTZ camera to capture according to the target capture posture and the target capture focal length.

In an embodiment of the present application, a monitoring system is provided. The monitoring system may include an electronic device and a PTZ camera; wherein
the PTZ camera is configured to capture an image of the monitored scene; and
the electronic device is configured to determine a target area to be monitored from an acquired image of the monitored scene; determine a target capture posture and a target capture focal length according to the target area; and control the PTZ camera to capture according to the target capture posture and the target capture focal length.

Those of ordinary skills in the art should understand that the discussion of any of the above embodiments is only exemplary, and is not intended to imply that the scope of the present disclosure (including the claims) is limited to these examples. Under the idea of the present application, features of the above embodiments or different embodiments can be combined, steps can be carried out in any order, and there are many other variations of the different aspects of the application as described above, which are not provided in details for the sake of brevity.

Additionally, in order to simplify illustration and discussion, and avoid obscuring the present application, well known power/ground connections to integrated circuit (IC) chips and other components may or may not be shown in the provided figures. Furthermore, apparatuses can be shown in a block diagram form in order to avoid obscuring the present application, and this also takes into account the fact that details regarding the implementations of these block diagram apparatuses are highly dependent on the platform on which the present application will be implemented (i.e., these details should be fully within the understanding of those skilled in the art). Under conditions that specific details (e.g., circuits) are set forth to describe exemplary embodiments of the present application, it will be apparent to those skilled in the art that the present application can be implemented with or without these specific details. Accordingly, these descriptions should be considered as illustrative rather than restrictive.

Although the present application has been described in conjunction with specific embodiments thereof, many alternatives, modifications, and variations to these embodiments will be apparent to those of ordinary skill in the art from the foregoing description. For example, other memory architectures (e.g., dynamic RAM (DRAM)) may use the discussed embodiments.

The embodiments of the present application are intended to cover all such alternatives, modifications and variations that fall within the broad scope of the appended claims. Therefore, any abbreviation, modification, equivalent replacement and improvement made within the spirit and principle of the present application shall be included in the protection scope of the present application.

The invention claimed is:

1. A monitoring method, comprising:
   determining a target area to be monitored from an acquired image of a monitored scene;
   determining a target capture posture and a target capture focal length according to the target area; and
   controlling a Pan Tilt Zoom (PTZ) camera to capture according to the target capture posture and the target capture focal length,
   wherein determining the target capture posture and the target capture focal length according to the target area comprises:
   determining one of preset areas where the target area is located as a target preset area, wherein the preset areas are marked out based on the image of the monitored scene, and a quantity of the preset areas is at least two;
   determining a corresponding candidate capture posture and a corresponding candidate capture focal length according to the target preset area, a candidate capture posture and a candidate capture focal length corresponding to each of the preset areas being obtained according to a range in the monitored scene corresponding to the preset area captured by the PTZ camera; and
   determining the target capture posture and the target capture focal length according to the determined candidate capture posture and candidate focal length.

2. The method according to claim 1, wherein determining the target capture posture and the target capture focal length according to the determined candidate capture posture and candidate focal length comprises:
   selecting a preset area from the image of the monitored scene as a first reference preset area, the first reference preset area being different from the target preset area;
   determining a posture change ratio parameter according to a distance between the target preset area and the first reference preset area, the candidate capture posture corresponding to the target preset area, and a candidate capture posture corresponding to the first reference preset area; and
   generating the target capture posture according to a distance between the target area and the target preset area, the candidate capture posture corresponding to the target preset area, and the posture change ratio parameter.

3. The method according to claim 2, wherein the target capture posture comprises a horizontal rotation angle and a vertical rotation angle;
   for the horizontal rotation angle, the distance between the target preset area and the first reference preset area is a horizontal distance between the target preset area and the first reference preset area, the distance between the target area and the target preset area is a horizontal distance between the target area and the target preset area, wherein the horizontal distance between the target preset area and the first reference preset area is not equal to zero; and
   for the vertical rotation angle, the distance between the target preset area and the first reference preset area is a vertical distance between the target preset area and the first reference preset area, the distance between the target area and the target preset area is a vertical distance between the target area and the target preset area, wherein the vertical distance between the target preset area and the first reference preset area is not equal to zero.

4. The method according to claim 1, wherein determining the target capture posture and the target capture focal length according to the determined candidate capture posture and candidate focal length comprises:
   determining a second reference preset area from the image of the monitored scene, the second reference preset area comprising the target preset area and an area of the second reference preset area being larger than an area of the target preset area, or alternatively, the target preset area comprising the second reference preset area and an area of the target preset area being larger than an area of the second reference preset area;
   obtaining a focal length change ratio parameter according to a ratio of the area of the target preset area to the area of the second reference preset area, the candidate capture focal length corresponding to the target preset area, and a candidate capture focal length corresponding to the second reference preset area; and
   generating the target capture focal length according to a ratio of an area of the target area to the area of the target preset area, the candidate capture focal length corresponding to the target preset area, and the focal length change ratio parameter.

5. The method according to claim 1, wherein a wide-angle camera is provided in the monitored scene, and determining the target area to be monitored from the acquired image of the monitored scene comprises:
   dividing the image into a first area and a second area, according to sharpness of photos captured by the wide-angle camera, wherein the sharpness of photos captured by the wide-angle camera reaches a preset sharpness threshold in the first area; and
   determining the second area as the target area.

6. An electronic device, comprising:
   a memory, configured to store computer programs; and
   a processor, configured to execute the computer programs stored in the memory to perform the monitoring method of claim 1.

7. A non-transient computer-readable storage medium having computer instructions stored thereon, wherein the computer instructions when executed by a computer cause the computer to perform the monitoring method of claim 1.

8. The method according to claim 1, wherein the image of the monitored scene is divided into at least two levels of preset areas according to sizes.

9. The method according to claim 1, further comprising:
   determining candidate capture postures and candidate capture focal lengths of four corners of the monitored scene; and
   determining the candidate capture posture and the candidate capture focal length corresponding to each of the preset areas by averaging.

10. A monitoring method, comprising:
    determining a target area to be monitored from an acquired image of a monitored scene;
    determining a target capture posture and a target capture focal length according to the target area; and
    controlling a Pan Tilt Zoom (PTZ) camera to capture according to the target capture posture and the target capture focal length,
    wherein determining the target area to be monitored from the acquired image of the monitored scene comprises:
    determining one or more candidate target areas from the image;

judging whether a quantity of the candidate target areas is greater than a quantity of PTZ cameras;
under a condition that the quantity of the candidate target areas is greater than the quantity of PTZ cameras, merging the determined candidate target areas, so that a quantity of merged candidate target areas is not greater than the quantity of PTZ cameras; and
determining the merged candidate target areas as target areas.

11. The method according to claim 10, wherein merging the determined candidate target areas comprises:
pre-merging every two candidate target areas to obtain pre-merged candidate target areas;
determining an area of each of the pre-merged candidate target areas;
selecting a pre-merged candidate target area whose area is smallest; and
merging two candidate target areas corresponding to the pre-merged candidate target area whose area is smallest.

12. The method according to claim 10, wherein merging the determined candidate target areas comprises:
determining an area of each of the candidate target areas;
selecting a candidate target area whose area is smallest;
determining a first distance between the candidate target area whose area is smallest and each of other candidate target areas;
selecting a candidate target area for which the first distance is shortest; and
merging the candidate target area whose area is smallest with the candidate target area for which the first distance is shortest.

13. The method according to claim 10, wherein merging the determined candidate target areas comprises:
determining an area of each of the candidate target areas;
selecting a candidate target area whose area is smallest;
determining a first distance between the candidate target area whose area is smallest and each of other candidate target areas;
selecting a candidate target area for which the first distance is shortest;
pre-merging the candidate target area whose area is smallest with the candidate target area for which the first distance is shortest, to obtain a pre-merged candidate target area;
determining an area of the pre-merged candidate target area;
comparing the area of the pre-merged candidate target area with a preset area threshold;
under a condition that the area of the pre-merged candidate target area is smaller than or equal to the area threshold, merging the candidate target area whose area is smallest with the candidate target area for which the first distance is shortest;
under a condition that the area of the pre-merged candidate target area is larger than the area threshold:
pre-merging the candidate target area whose area is smallest with each of the other candidate target areas except the candidate target area for which the first distance is shortest sequentially, in an order of first distances from short to long, and
when an area of any pre-merged candidate target area is smaller than or equal to the preset area threshold, merging two candidate target areas that are pre-merged to obtain the pre-merged candidate target area.

14. The method according to claim 13, wherein merging the determined candidate target areas comprises:
under a condition that areas of all pre-merged candidate target areas are larger than the area threshold,
selecting a candidate target area from the other candidate target areas except the candidate target area for which the first distance is shortest sequentially, in an order of areas from small to large;
determining a second distance between the selected candidate target area and each of the other candidate target areas;
pre-merging the selected candidate target area with each of the other candidate target areas sequentially, in an order of second distances from short to long; and
when an area of any pre-merged candidate target area is smaller than or equal to the preset area threshold, merging two candidate target areas that are pre-merged to obtain the pre-merged candidate target area.

15. The method according to claim 10, wherein merging the determined candidate target areas comprises:
determining a distance between every two candidate target areas; and
merging the candidate target areas sequentially, in an order of distances from small to large, until a quantity of the merged candidate target areas is not greater than the quantity of PTZ cameras.

16. An electronic device, comprising:
a memory, configured to store computer programs; and
a processor, configured to execute the computer programs stored in the memory to perform the monitoring method of claim 10.

17. A non-transient computer-readable storage medium having computer instructions stored thereon, wherein the computer instructions when executed by a computer cause the computer to perform the monitoring method of claim 10.

18. A monitoring method, comprising:
determining a target area to be monitored from an acquired image of a monitored scene;
determining a target capture posture and a target capture focal length according to the target area; and
controlling a Pan Tilt Zoom (PTZ) camera to capture according to the target capture posture and the target capture focal length,
wherein determining the target area to be monitored from the acquired image of the monitored scene comprises:
determining a moving object and areas where the moving object is located according to a plurality of consecutive frames of the image; and
determining the target area based on the areas where the moving object is located, and
wherein determining the target area based on the area where the moving object is located comprises:
judging whether an quantity of the areas where the moving object is located is greater than a quantity of PTZ cameras;
under a condition that the quantity of the areas where the moving object is located is greater than the quantity of PTZ cameras:
determining moving ranges of the moving object; ranking priorities of the areas where the moving object is located in an order of the moving ranges of the moving object from large to small; and selecting, in an order of the priorities from high to low and according to the quantity of PTZ cameras, the areas where the moving object is located as target areas; or
determining the moving ranges of the moving object; determining candidate areas where the moving object is located for which the moving ranges of the moving object are greater than a preset moving threshold, according to the moving ranges of the moving object; judging whether an quantity of the candidate areas where the moving object is located is greater than the quantity of PTZ cameras; under a condition that the quantity of the candidate areas where the moving object is located is greater than the quantity of PTZ cameras, merging the candidate areas where the moving object is located, so that a quantity of the merged candidate areas where the moving object is located is equal to the quantity of PTZ cameras; and determining the merged candidate areas where the moving object is located as the target area.

19. An electronic device, comprising:

a memory, configured to store computer programs; and a processor, configured to execute the computer programs stored in the memory to perform the monitoring method of claim 18.

20. A non-transient computer-readable storage medium having computer instructions stored thereon, wherein the computer instructions when executed by a computer cause the computer to perform the monitoring method of claim 18.

* * * * *